May 27, 1952  H. T. HOFFMAN  2,598,258
ENERGY TRANSLATING DEVICE
Filed Oct. 8, 1949

INVENTOR.
HOWARD T. HOFFMAN
BY
Raymond W. Jenkins
ATTORNEY

Patented May 27, 1952

2,598,258

UNITED STATES PATENT OFFICE 2,598,258

ENERGY TRANSLATING DEVICE

Howard T. Hoffman, Elmhurst, Ill., assignor to Bailey Meter Company, a corporation of Delaware Application October 8, 1949, Serial No. 120,311

15 Claims. (Cl. 323—64)

My invention relates to apparatus for transferring an energy signal from one system to another, or of translating a force of one nature into a proportional or representative force of another nature. Such a device is commonly called a transducer.

Specifically I interrelate an electric network with a fluid pressure system to the end that a signal in one is translated into a signal in the other.

In the control of furnaces, vapor generators, refineries, and similar processes it is frequently necessary to tie together the elements of an electric control system and the elements of a fluid pressure control system to the end that a control signal originating in the electric network will be effective in the fluid pressure control system or vice versa.

When I speak of a control signal I mean any value, position, or the like, which dictates a desired operation. For example, an electric measuring network may establish a control signal representative of a measured value and manifest it as a voltage, current, or the like. A fluid pressure control system might establish a fluid loading pressure representative of a measured value. The voltage, current, fluid pressure, or the like may be continuous in nature but variable as to magnitude or may be as a series of impulses whose spacing may be varied or whose magnitude may be varied or the like. In any event, a control signal is established dictating a control action.

My invention will be described specifically in connection with electric current signals and air pressure signals although it may, equally as well, be embodied in other systems.

Figure 1:
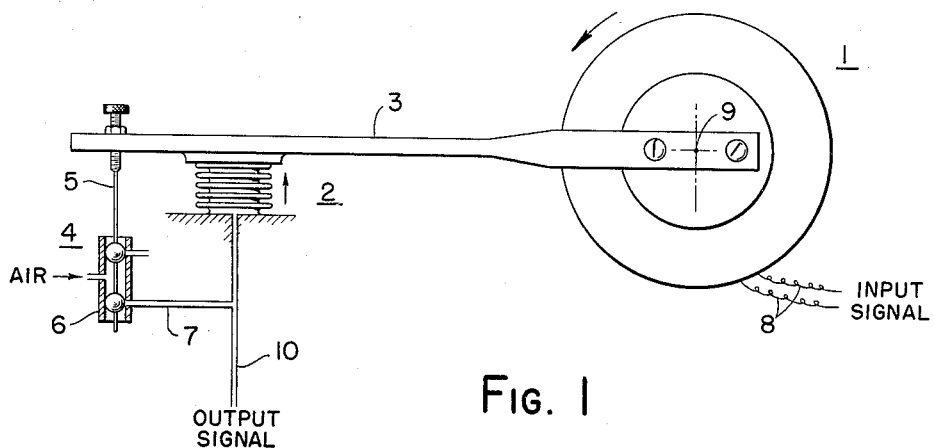
Fig. 1 illustrates a transducer for translating an electric current signal into an air pressure signal.

Referring first to Fig. 1 I show therein a transducer having force elements 1 and 2 acting upon a force beam 3 to control a pilot valve 4.

The pilot valve 4 may be of the type disclosed and claimed in the patent of Johnson 2,054,464. Briefly a pilot stem 5 is positioned axially in a sleeve 6 to which air under pressure is available. An outlet pipe 7, from the casing 6, confines an air loading pressure of a value determined by the axial positioning of the stem 5. As shown, a minimum of pressure exists within the pipe 7. As the stem 5 is lowered the pressure within the pipe 7 is increased to a maximum and may be equal in value to the pressure of the air supply to the casing 6. For every axial position of the stem 5 there exists in the pipe 7 a corresponding air loading pressure and, depending upon the design of the pilot valve 4, the relation between axial movement of stem 5 and pressure within pipe 7 may be linear or otherwise as desired.

Figure 3:
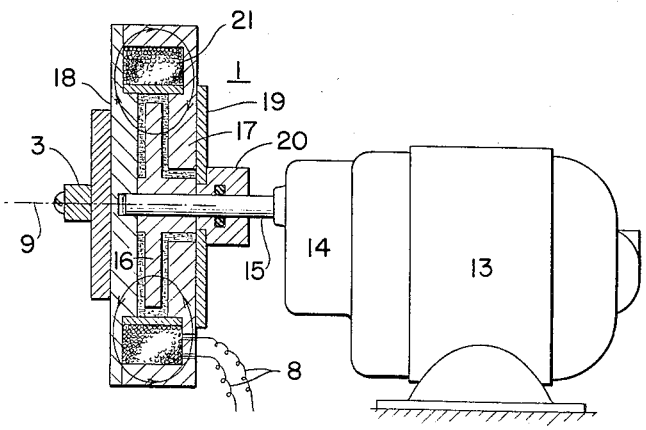
Fig. 3 is a more detailed view of a portion of both Figs. 1 and 2.

The force element 1 comprises a magnetic-fluid clutch which is illustrated in Fig. 3 and will be described more in detail hereinafter. It suffices to say at this point that an electric input signal, available at wires 8, controls the force tending to move the beam 3 counterclockwise around a center 9, there being a definite predesigned relation between the counterclockwise acting force and the value of the electric input signal.

The air loading pressure within pipe 7 is also available within the expansable chamber, or bellows 2, making the latter effective to apply a clockwise directional force tending to rotate the beam 3 around the center 9. If the clockwise and the counterclockwise forces are equal, the beam 3 will be stationary and the pilot stem 5 at some predetermined position in the casing 6, determining pressure within the element 2.

Under such a condition of balance, with the force tending to move the beam in clockwise rotation around center 9 being equal to the force tending to rotate the beam 3 counterclockwise around the center 9, it is apparent that the air pressure signal within the pipe 7 bears a definite relation to the electric input signal. Inasmuch as the pressure of the air within the pipe 7 and bellows 2 is also available in pipe 10, it constitutes a fluid pressure output signal bearing a definite relation to the electric input signal.

Upon change in value of the electric input signal at wires 8, the counterclockwise rotative force of element 1 increases or decreases thus changing the position of the pilot stem 5 relative to its casing 6 to correspondingly increase or decrease the air loading pressure within the conduit 7 and bellows 2 until the force of bellows 2 acting in clockwise direction upon the beam 3 exactly balances the new force impressed upon beam 3 by the element 1 and the system stabilizes to a new position of balance.

For example, assume that the electrc input signal at wires 8 increases, thus causing an increase in counterclockwise force around the center 9. The resultant movement of the left hand end of beam 3 lowers the stem 5 allowing a greater portion of the air supply pressure to be effective within the pipe 7 and within the bellows 2. The increase in pressure within bellows 2, acting in a clockwise direction upon beam 3 tends to move the beam in clockwise rotation until a balance is reached. The increased air loading pressure within pipe 7 is also effective within pipe 10 as an increased air output signal bearing a definite design relation to the increased electric input signal available at wires 8.

Figure 2:
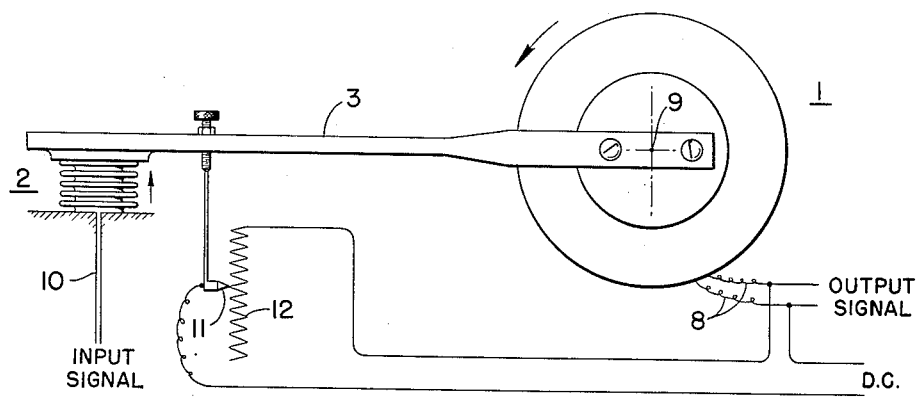
Fig. 2 illustrates a transducer for translating an air pressure signal into an electric current signal.

Fig. 2 provides in general a reverse acting transducer to that I have just described in connection with Fig. 1. Here the input signal of a fluid pressure such as air is effective within the pipe 10 and bellows 2 tending to move the beam 3 in clockwise rotation around the center 9. Any such movement of beam 3 moves the contact 11 along a resistance, or rheostat, 12 connecting a source of D.-C. to the winding of the magnetic clutch device 1 by way of wires 8. When the contact 11 has been moved along the resistance 12 an amount sufficient to vary the current that passes to the wires 8, and thus the strength of the magnetic clutch 1, the counterclockwise portion of such clutch acting around the center 9 causes the beam 3 to come to a balanced position wherein the upward force of bellows 2 is counterbalanced by the downward force of the clutch 1. The D.-C. current across the wires 8 constitute an electric output signal bearing a definite design proportionality or relation to the air input signal at pipe 10. The interchanged positions of the bellows of Fig. 1 and the bellows of Fig. 2 with the air pilot valve and resistance, or rheostat, with their magnetic-fluid couplings is disclosed as illustrating alternate arrangements possible with the apparatus of each figure.

Referring now to Fig. 3, I show therein a side sectional elevation of the force unit 1 mounted on, and driven by, an electric motor 13 through a gear reducer 14. The motor 13 may be a small synchronous motor continuously rotating in given direction and thus continuously rotating a shaft 15 at a predetermined speed in given direction.

Keyed to the shaft 15 is a disk 16 of magnetizable material, adapted for rotation in a cavity having relatively parallel walls 17, 18 which, with parts 19 and 20 of brass, form a housing for the cavity bearing at both ends upon the shaft 15 rotatably movable around the shaft and the disk 16 carried thereby.

In the cavity housing comprising the parts 17 and 18 is assembled a winding 21 having electric leads 8 and arranged with the elements 17 and 18 to provide an electromagnet which, while preferably D.-C., may be A.-C. if its component parts are properly designed.

Surrounding the disk 16 of magnetizable material, and filling the cavity formed by the parts 18, 17, 19 and 20, is an oil-iron particle mixture included in the path of the magnetic flux produced by the winding 21. The fluid-particle mixture may, for most applications, be spherical iron particles of the order of 8 microns mixed with a liquid such as oil to prevent packing and to afford smooth operation. When the mixture is acted upon by a magnetic field the fluid seemingly solidifies, freezes or congeals and the iron particles become individual magnets and form chain ties interconnecting the magnetic plates or surfaces. As a clutch or driving connection between parallel surfaces, the action is smooth because all contacting surfaces, both of the plates and the iron power particles, are coated by a lubricant.

As the current of the D.-C., effective through wires 8, is increased, the magnetic flux through the oil-iron mixture increases, and the solidifying or congealing of the mixture increases within certain limits. Thus the clutching force between the continuously rotated disk 16 and the parallel plates 17, 18 varies with the current of the D.-C. applied to wires 8.

As will be seen, any tendency to rotate of the elements 17, 18 also tends to move the beam 3 around the center of rotation 9. It will thus be apparent that a force is applied to the beam 3, tending to move it in a predetermined rotary direction, bearing a definite relation to the value of the D.-C. current applied to wires 8. As previously pointed out the wires 8 may be the recipients of an electric control input signal desirably translated into a fluid pressure output signal or the reverse may be the case wherein a fluid pressure input signal determines the interrelated value of an electric output signal. In either direction of operation of the transducer, the arrangement may include a power amplification. For example, a relatively minute value of electric current or change in value may be converted into a substantially greater fluid pressure output signal, or a relatively small fluid pressure input signal may be translated into a considerably greater electric output signal.

It will be apparent that the transducer of my invention may be included in many systems and arrangements and it does not appear to be necessary to show any such systems in detail as it will be fully understood by those familiar with the art how the referred-to input signals may be originated or the referred-to output signals may be used.

While I have shown and described certain preferred embodiments of my invention, it will be understood that this is to be considered as illustrative only and not to be considered as limiting.

What I claim as my invention, and desire to secure by Letters Patent of the United States is:

1. A device for translating a first form of energy to a second form of energy comprising in combination, first means establishing a first torque with the first form of energy as the translated input to the device, a balance member upon which the first torque is imposed, balance means for establishing a second torque upon said balance member in opposition to the first torque for balancing the device, and means positioned by the balance member to regulate the value of the second form of energy acting upon the balance means and establish the second form of energy as the translating output of the device.

2. A device for translating an electric energy signal into a fluid pressure signal including in combination, a torque producing means receiving the electric energy signal, a force balance beam upon which the torque producing means acts in one direction, a fluid pressure responsive means arranged to act upon the balance beam in a direction in opposition to the first torque producing means, and a fluid pressure controlling valve positioned by the balance beam, the fluid pressure so established acting upon the fluid pressure responsive means.

3. The combination of claim 2 wherein the fluid pressure is an air pressure and the fluid pressure responsive means is an expandable-contractable chamber.

4. A device for translating a fluid pressure signal into an electric signal representative thereof, including in combination, a force balance member, fluid pressure signal responsive means imposing a force upon said member in one direction, electric energy responsive means arranged to impose an opposing force upon said member, and an electric signal varying means positioned by said member, said electric signal being applied to said electric energy responsive means.

5. A transducer of electrical energy comprising, a conducting path for said electrical energy which forms a magnetic flux field, a fluid mixture whose viscosity varies in accordance with the strength of a magnetic flux field in which it is immersed, a member whose rotation is maintained by means of a second energy source of constant strength, a housing member coupled to said rotating member through the variably viscous fluid mixture, a beam to which the output torque of said housing is applied, a means of applying a third energy source to said beam as a torque in opposition to the output torque of said housing, and means of varying the application of said third energy in accordance with the torque output of said housing that equilibrium of the beam is maintained while the variation of the application of said third energy becomes a translation of the electrical energy.

6. A transducer of electrical energy comprising, an annular coil for said electrical energy around which forms an electro-magnetic flux field, a mechanical mixture of iron particles and suspending fluid within said flux field, a shaft revolving under a source of constant torque, a housing containing the mixture whose coupling to the shaft is through the mixture, a beam to which the torque of the housing is transmitted, means of applying fluid pressure energy to the beam in a torque opposite in direction to that applied by the housing, and means of varying application of the fluid pressure energy to the beam so that the torque it creates will balance the torque applied by the housing while said application variation becomes a function of the electrical energy input to the annular coil.

7. A transducer for expressing electrical signals in terms of air pressure signals comprising, a force-receiving beam, a housing member rigidly secured to said beam, a constant-speed synchronous motor, a fluid coupling between said housing and said motor whose strength varies in accordance whith an immersing magnetic flux field, an electrical conductor within said housing for conducting said electrical signals and thereby applying to said fluid coupling a magnetic flux field dependent upon said electrical signals, a bellows member for applying said air pressure signals to said beam in opposition to the output torque of said fluid coupling, and a pilot valve connected to said beam which controls the air pressure signals to said bellows member in accordance with the position of the beam determined by the coupling torque to maintain a balance between both torques on the beam with said air pressure signals having thereby a fixed relation to said electrical signals.

8. A transducer for translating an energy signal of a first form to an energy signal of a second form including, in combination, a conducting path for an electric energy signal which forms a magnetic flux field, a fluid mixture whose viscosity varies in accordance with the strength of a magnetic flux field in which it is immersed, a member whose rotation is maintained by means of a second energy source of constant strength, a housing member coupled to said rotating member through a variably viscous fluid mixture, a beam to which the output torque of said housing is applied, a means of applying a third energy source to said beam as a torque in opposition to the output torque of said housing, and means of varying the application of one of the first and second energies in accordance with the difference between the opposed torques on the beam that equilibrium of the beam is maintained while variation of one of the energies becomes a translation of the other energy variation.

9. A transducer for translating an energy signal of a first form to an energy signal of a second form including, in combination, an annular coil for an electrical energy signal around which forms an electro-magnetic flux field, a mechanical mixture of iron particles and suspending fluid within said flux field, a shaft revolving under a source of constant torque, a housing containing the mixture whose coupling to the shaft is through the mixture, a beam to which the torque of the housing is transmitted, means of applying fluid pressure energy to the beam in a torque opposite in direction to that applied by the housing, and means positioned by the beam for varying application of one of the energies to its torque producing means acting on the beam so the torques will balance and the one energy becomes a translation of the other.

10. A transducer for expressing electrical signals and air pressure signals the one in terms of the other including, in combination, a force-receiving beam, a housing member rigidly secured to said beam, a constant-speed synchronous motor, a fluid coupling between said housing and said motor whose strength varies in accordance with an immersing magnetic flux field, an electrical conductor within said housing for conducting electrical signals and thereby applying to said fluid coupling a magnetic flux field dependent upon said electrical signals, a bellows member for applying air pressure signals to said beam in opposition to the output torque of said fluid coupling, and a means connected to said beam which controls one of the opposed torque producers in accordance with beam position to maintain a balance between both torques on the beam for thereby maintaining a determinable relationship between air and electrical signals.

11. A transducer of fluid pressure signals into electric energy signals representative thereof, including in combination, a force-balance member, fluid pressure signal responsive means imposing a force upon said member in one direction, a conducting path for an electric energy signal which forms a magnetic flux field, a fluid mixture whose viscosity varies in accordance with the strength of a magnetic flux field in which it is immersed, a member whose rotation is maintained by means of a second energy source of constant strength, a housing member coupled to said rotating member through the variably viscous fluid mixture, the output torque of said housing member applied to said force-balance member in opposition to the fluid pressure responsive means, and means of varying the electric energy signal in accordance with balance member position that equilibrium of the balance member is maintained while the variation in electrical signal becomes a translation of the fluid pressure signal.

12. A transducer of fluid pressure energy, including in combination, a torque balance beam, means of applying a fluid pressure energy signal to the beam, an annular coil receptive of electric energy to form an electro-magnetic flux field, a mechanical mixture of iron particles and suspending fluid within said flux field, a shaft revolving under a source of constant torque, a housing containing the mixture whose coupling to the shaft is through the mixture, the torque of the housing being applied to the beam in opposition to the fluid pressure energy signal, and means of varying electric energy to the annular coil controlled by beam position so that the torque applied to the housing will balance the torque of the fluid pressure energy signal and at the same time becomes a functional translation of the fluid pressure energy signal.

13. A transducer for expressing air pressure signals in terms of electrical signals, including in combination, a force-receiving beam, a housing member rigidly secured to said beam, a constant-speed synchronous motor, a fluid coupling between said housing and said motor whose strength varies in accordance with an immersing magnetic flux field, an electrical conductor within said housing for conducting electrical signals and thereby applying to said fluid coupling a magnetic flux field dependent upon said electrical signals, a bellows member for applying air pressure signals to said beam in opposition to the output torque of said fluid coupling, and electrical signal varying means adjusted in accordance with the position of the beam to vary the torque applied to the beam determined by the coupling to maintain a balance between both torques where the value of the electrical signal becomes a translation of the air pressure signal.

14. A device for translating a first form of energy to a second form of energy including, a pivoted balance member, means under control of a variable first form of energy establishing a first torque on the balance member, means under control of a regulable second form of energy establishing a balancing second torque on the balance member in opposition to the first torque, and means positioned by the balance member for simultaneously regulating the value of the second energy form establishing the balancing second torque and establishing the second energy form as an output proportional to the variable first form of energy.

15. A translator including, a pivoted balance member, a source of a first form of variable energy, means establishing a first torque on the balance member under control of the first form of energy, a source of a regulable second form of energy, means for exerting a balancing second torque on the balance member in opposition to the first torque, and energy control means for the second energy form positioned by the balance member for simultaneously regulating the value of the balancing second torque to maintain the balancing member in a substantially fixed position and establishing the regulated energy as an output proportional to the first form of energy.

HOWARD T. HOFFMAN.

REFERENCES CITED

The following references are of record in the file of this patent:

UNITED STATES PATENTS

| Number | Name | Date |
|---|---|---|
| 1,160,608 | Hubbard | Nov. 16, 1915 |
| 1,450,720 | Gassman | Apr. 3, 1923 |
| 2,296,177 | Newton | Sept. 15, 1942 |
| 2,443,891 | Buerschaper | June 22, 1948 |